March 30, 1948.   D. W. BLOSER   2,438,799
SYNCHRONOUS REPEATER UNIT
Filed Nov. 21, 1946

INVENTOR.
Dwight W. Bloser
BY
ATTORNEY.

Patented Mar. 30, 1948

2,438,799

UNITED STATES PATENT OFFICE 2,438,799

SYNCHRONOUS REPEATER UNIT

Dwight W. Bloser, West Englewood, N. J., assignor, by mesne assignments, to Kearfott Company, Inc., New York, N. Y., a corporation of New York Application November 21, 1946, Serial No. 711,301

4 Claims. (Cl. 172—120)

1

This invention relates to synchronous repeater units of the type having stationary field and exciter windings and a magnetic rotor, the position of which is a function of the voltage distribution in the field windings.

In units of the above type as commonly constructed the stator and rotor magnetic paths have one or more common points, other than the required rotor air gaps, which give rise to non-uniform magnetic leakage of such nature that a second harmonic error is introduced into the follow-up system. An object of the present invention is to provide a construction in which this source of such error is eliminated.

Another object is to provide a construction in which the amount of copper and the resulting copper loss in the field winding is reduced to a minimum.

Another object is to provide a novel and improved unit of the above type which is relatively simple to construct and assemble.

Another object is to provide a small, light weight unit of the above type in which the positional error is reduced to a minimum.

Another object is to provide a novel and improved construction in which the exciting coil can be readily removed and replaced to obtain a winding having a selected impedance.

Various other objects and advantages will be apparent as the nature of the invention is more fully disclosed.

Although the novel features which are believed to be characteristic of this invention are pointed out more particularly in the claims appended hereto, the nature of the invention will be better understood by referring to the following description taken in connection with the accompanying drawing in which a specific embodiment thereof has been set forth for purposes of illustration.

Figure 1:
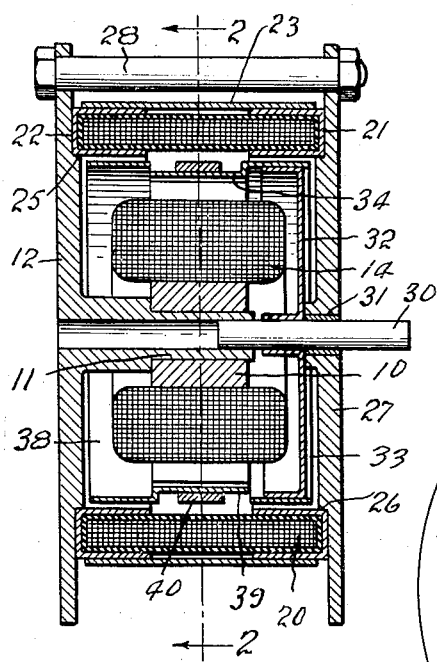
Fig. 1 is an axial section through a synchronous repeater unit embodying the present invention.
Figure 2:
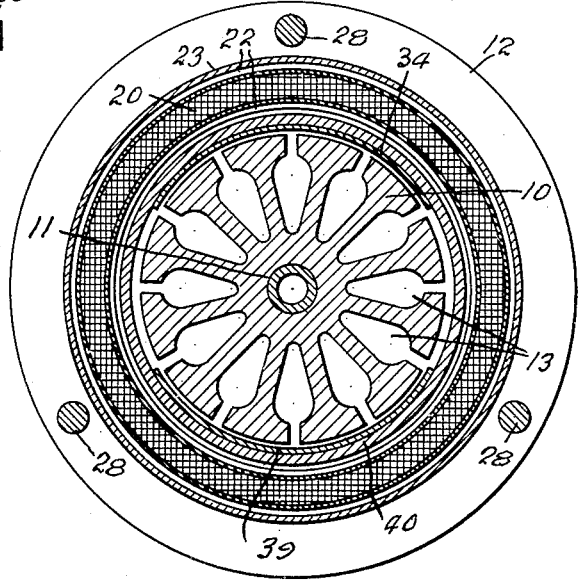
Fig. 2 is a transverse section taken on the line 2—2 of Fig. 1 with the field windings omitted.
Figures 3, 4, 5:
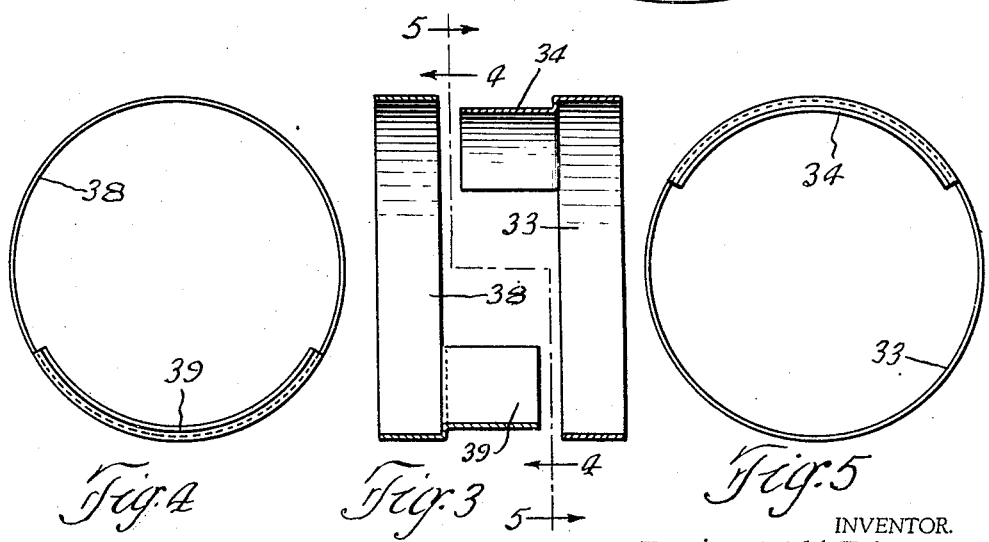

Fig. 3 is an axial section through the rotor members showing the relationship of the pole pieces; and Figs. 4 and 5 are transverse sections taken along the lines 4—4 and 5—5 of Fig. 3 and looking in the direction indicated by the respective arrows.

Referring to the drawings more in detail, the unit is shown as comprising a central stationary magnetic field member 10 which is mounted on a hub 11 formed on an end plate 12 of non-magnetic material. The field member 10 is provided with slots 13 carrying a distributed field winding 14 which in the case of a three-phase field comprises three sections displaced by 120° or in the case of a two-phase field comprises two sections displaced by 90°. The field member 10 and windings 14 are similar to the usual construction of a distributed field except that in this instance the field member is centrally located and is provided with external slots in which the windings are located, whereas in the usual external field the slots project inwardly from an annular magnetic member.

An annular exciting coil 20 carries at its ends annular members 21 and 22 of magnetic material which are of U-shaped cross section. The coil 20 is wound to maintain the members 21 and 22 at opposite polarities. These members are joined by a ring 23 of magnetic material which completes the magnetic return circuit therebetween. The U-shaped member 22 is seated against a shoulder 25 formed on the end plate 12 and the U-shaped member 21 is seated against a shoulder 26 formed on a second end plate 27. The end plates 12 and 27 are secured by means of a plurality of bolts 28 which are spaced around the periphery thereof.

A rotor shaft 30 is journaled in a bushing 31 in the end plate 27 and within the hub 11 of the end plate 12. The shaft 30 carries a cup-shaped member 32 of non-magnetic material to which a ring 33 of magnetic material is attached. The ring 33 is positioned to rotate within the U-shaped member 21 with a minimum of clearance. A segmental pole piece 34 having a substantial angular span, for example a span of 120°, projects axially from the ring 33 and is positioned to rotate around the periphery of the magnetic field member 10 with a minimum of clearance therefrom.

A similar ring 38 of magnetic material carrying an axially projecting pole piece 39 is positioned to rotate within the U-shaped magnetic member 22. The ring 38 is supported by a ring 40 of non-magnetic material which is disposed about the pole pieces 34 and 39 and secured thereto.

In the operation of this device an alternating exciting current is supplied to the exciting coil 20. This exciting current will induce voltages in the field windings 14, distribution of which is determined by the position of the pole pieces 34 and 39 of the rotor. The magnetic circuit may be traced from the member 21 to the magnetic ring 33 of the rotor, thence to the pole piece 34 and magnetic stator field member 10, passing diametrically through the stator field member 10 to the pole piece 39 and ring 38 of the rotor, thence to the U-shaped member 22 and through the magnetic ring 23 to the U-shaped member 21. It will be noted that since this path extends diametrically through the field member 10, its length has been reduced to a minimum, thereby reducing the required magnetizing force. Also the construction is such that the preformed exciting coil can be removed and replaced as desired to provide the proper impedance characteristics. The non-uniform leakage flux which usually occurs with crossed stator and rotor magnetic paths is eliminated. Hence the possibility of a second harmonic error is reduced and a more accurate follow-up system is obtained.

The distribution of the voltages induced in the three-phase or two-phase field windings 14 is varied in accordance with the position of the rotor poles 34 and 39 in accordance with the usual principles of synchronous follow-up units. It will be understood that the device may be constructed either as a transmitter or as a receiver. In the embodiment shown the shaft 30 may be connected to a suitable actuating device for manually or mechanically positioning the rotor as desired. In the case of a receiver the shaft 30 would of course be connected to an indicating or follow-up mechanism.

Although a specific embodiment of the invention has been shown for purposes of illustration, it is to be understood that the invention is not to be restricted thereto but is only to be limited in accordance with the scope of the following claims.

What is claimed is:

1. A synchronous repeater unit comprising an internal stator of magnetic material having external slots carrying distributed windings, an annular exciting coil concentric with said stator and spaced radially therefrom, said coil being symmetrically disposed with respect to said stator and wound to produce opposite polarities at its two axially spaced ends, annular members of magnetic material disposed at said ends interiorly of said coil to be maintained thereby at opposite polarities, and a rotor concentric with said stator comprising a pair of axially spaced rings of magnetic material disposed to rotate within the respective annular members, each of said rotor rings having an axially projecting segmental pole piece disposed to rotate around the periphery of said stator.

2. A synchronous repeater unit comprising an internal stator of magnetic material having external slots carrying distributed windings, an annular exciting coil concentric with said stator and spaced radially therefrom, said coil being symmetrically disposed with respect to said stator and wound to produce opposite polarities at its two axially spaced ends, annular members of magnetic material disposed at said ends interiorly of said coil to be maintained thereby at opposite polarities, and a rotor concentric with said stator comprising a pair of axially spaced rings of magnetic material disposed to rotate within the respective annular members, each of said rotor rings having an axially projecting segmental pole piece disposed to rotate around the periphery of said stator, and a ring of non-magnetic material encircling said pole pieces and secured thereto to support said rotor as a unit.

3. A synchronous repeater unit comprising an internal stator of magnetic material having external slots carrying distributed windings, an annular exciting coil concentric with said stator and spaced radially therefrom, said coil being symmetrically disposed with respect to said stator and wound to produce opposite polarities at its two axially spaced ends, annular members of U-spaced cross section enclosing the two ends of said coil to be maintained thereby at opposite polarities, a ring of magnetic material encircling said coil and joined to said annular members to complete the magnetic return circuit therebetween, and a rotor concentric with said stator comprising a pair of axially spaced rings of magnetic material disposed to rotate within the respective annular members, each of said rotor rings having an axially projecting segmental pole piece disposed to rotate around the periphery of said stator.

4. A synchronous repeater unit comprising an internal stator of magnetic material having external slots carrying distributed windings, an annular exciting coil concentric with said stator and spaced radially therefrom, said coil being symmetrically disposed with respect to said stator and wound to produce opposite polarities at its two axially spaced ends, annular members of magnetic material disposed at said ends interiorly of said coil to be maintained thereby at opposite polarities, and a rotor concentric with said stator comprising a pair of axially spaced rings of magnetic material disposed to rotate within the respective annular members, each of said rotor rings having an axially projecting segmental pole piece disposed to rotate around the periphery of said stator, end plates carrying said stator and said coil and having an axial bearing in which said rotor is journalled, and means clamping said end plates for supporting the entire unit.

DWIGHT W. BLOSER.